United States Patent [19]

Sato

[11] Patent Number: 5,474,228

[45] Date of Patent: Dec. 12, 1995

[54] EXTERNAL LEAD BONDING METHOD AND APPARATUS

[75] Inventor: Koji Sato, Tokyo, Japan

[73] Assignee: Kabushiki Kaisha Shinkawa, Tokyo, Japan

[21] Appl. No.: 296,648

[22] Filed: Aug. 26, 1994

[30] Foreign Application Priority Data

Aug. 28, 1993 [JP] Japan .................................. 5-235527

[51] Int. Cl.$^6$ .................................................. B23K 31/02
[52] U.S. Cl. .................................... 228/180.21; 228/6.2
[58] Field of Search ............................. 228/180.21, 6.2, 228/49.5, 44.7

[56] References Cited

U.S. PATENT DOCUMENTS 4,887,758  12/1989  Suzuki et al. ............................ 228/6.2
4,979,664  12/1990  Lyons et al. ........................ 228/180.21

FOREIGN PATENT DOCUMENTS 63-40328  2/1988  Japan .............................. 228/180.21
4-67782  10/1992  Japan .

OTHER PUBLICATIONS

Jensen, "Self–Leveling Soldering Tool," *IBM Tech. Discl. Bull.*, vol. 11, No. 8, Jan. 1969, p. 1026.

Primary Examiner—P. Austin Bradley
Assistant Examiner—Jeffrey T. Knapp
Attorney, Agent, or Firm—Koda and Androlia

[57] ABSTRACT

A bonding method and apparatus for bonding leads of a solid-state device to leads of a lead frame includes a tool arm formed with first and second bonding sections. The first bonding section bonds external leads on two opposing sides of the solid-state device to leads of the lead frame, and then the second bonding section bonds external leads on other two opposing sides of the solid-state. When these bindings are performed, the solid-state device except for the external leads is not in touch with the bonding sections that are defined by pairs of ridges.

6 Claims, 4 Drawing Sheets

EXTERNAL LEAD BONDING METHOD AND APPARATUS

BACKGROUND OF THE INVENTION

1. Field of the Invention

The present invention relates to an external lead bonding method and apparatus which are used to bond the external leads of solid-state devices punched out of a film carrier to lead frames or circuit boards.

2. Prior Art

The apparatus disclosed in the Japanese Patent Application Publication (Kokoku) No. 4-67782 is known as a conventional external lead bonding apparatus.

When the external leads of a solid-state device are aligned with and bonded to the leads of a lead frame in this apparatus, positional discrepancies may occur unless the solid-state device is fixed in place. In order to prevent such discrepancies, the apparatus includes a first bonding station and a second bonding station. At the first bonding station, bonding is performed on two opposite sides of the solid-state device which are not reached by the transporting arm to which the vacuum suction chucking head is attached. This bonding is performed with the solid-state device pressed against the lead frame by a vacuum suction chucking head which suction-chucks the solid-state device. At the second bonding station, the remaining two opposite sides of the solid-state device are subsequently bonded after the transporting arm has been withdrawn.

More specifically, a solid-state device which has been punched out of a film carrier by the punching of a punching apparatus is suction-chucked by the vacuum suction chucking head attached to the transporting arm and moved to a position above the first bonding station. Then, the solid-state device is lowered and pressed against the lead frame while still being held on the vacuum suction chucking head.

In this state, the leads on two opposite sides of the solid-state device are simultaneously bonded to the lead frame by the first bonding tool of a first bonding apparatus. Afterward, the first bonding tool is raised, and the vacuum suction chucking head is raised and moved to a position above the punching apparatus. The lead frame to which two opposite sides of the solid-state device have been bonded is then conveyed to the second bonding station, where the leads on the remaining two opposite sides of the solid-state device are bonded to the lead frame by the second bonding tool of a second bonding apparatus.

In this prior art, bonding is performed at two different bonding stations. Accordingly, two separate bonding apparatuses are required. As a result, it requires high equipment costs and a large installation space. Furthermore, since two bonding tools are used, attachment and level adjustment of the bonding tools must be performed at the respective bonding stations. Thus, it takes a relatively long time for accomplishing adjustment and maintenance.

SUMMARY OF THE INVENTION

The object of the present invention is to provide an external lead bonding method and apparatus which can bond all four sides of a solid-state device using a single bonding apparatus, thus reducing the equipment costs, the installation space and the adjustment and maintenance time.

The method for accomplishing the object of the present invention uses a tool arm which has a first bonding tool section which bonds external leads installed along two opposite sides of a solid-state device to the leads of a lead frame and a second bonding tool section which bonds external leads installed along the other two opposite sides of the solid-state device to the leads of the lead frame. Bonding is first performed by the first bonding tool section with the solid-state device, which is attached by vacuum suction to a vacuum suction chucking head, pressed against the lead frame positioned in the bonding-station; then the vacuum suction chucking of the solid-state device by the vacuum suction chucking head is stopped, and the vacuum suction chucking head is withdrawn from the bonding station; and then finally the remaining two opposite sides of the solid-state device are bonded by the second bonding tool section.

The apparatus for accomplishing the object of the present invention includes a vacuum suction chucking head, which presses a suction-chucked solid-state device against a lead frame which is positioned in the bonding station, and a bonding apparatus which bonds the external leads of the solid-state device to the leads of the lead frame. The tool arm of the bonding apparatus is equipped with a first bonding tool section and a second bonding tool section each having an escape space so that the vacuum suction chucking head does not come into touch with the tool arm. The first bonding tool section simultaneously bonds the external leads installed along two opposite sides of the solid-state device while the device is pressed against the lead frame by the vacuum suction chucking head to the leads of the lead frame, and then the second bonding tool section simultaneously bonds the external leads installed along the other or remaining two opposite sides of the solid-state device to the leads of the lead frame.

When the bonding is performed, the external leads on two opposite sides of the solid-state device are bonded to the leads of the lead frame by the first bonding tool section with the solid-state device attached by vacuum suction to the vacuum suction chucking head pressed against the lead frame. Then, the vacuum suction chucking of the solid-state device by the vacuum suction chucking head is stopped, and the vacuum suction chucking head is withdrawn from the bonding station. Afterward, the external leads on the remaining two opposite sides of the solid-state device are bonded to the leads of the lead frame in the bonding station.

DETAILED DESCRIPTION OF THE INVENTION

One embodiment of the present invention will be described below with reference to FIGS. 1 through 5.

Figure 1:
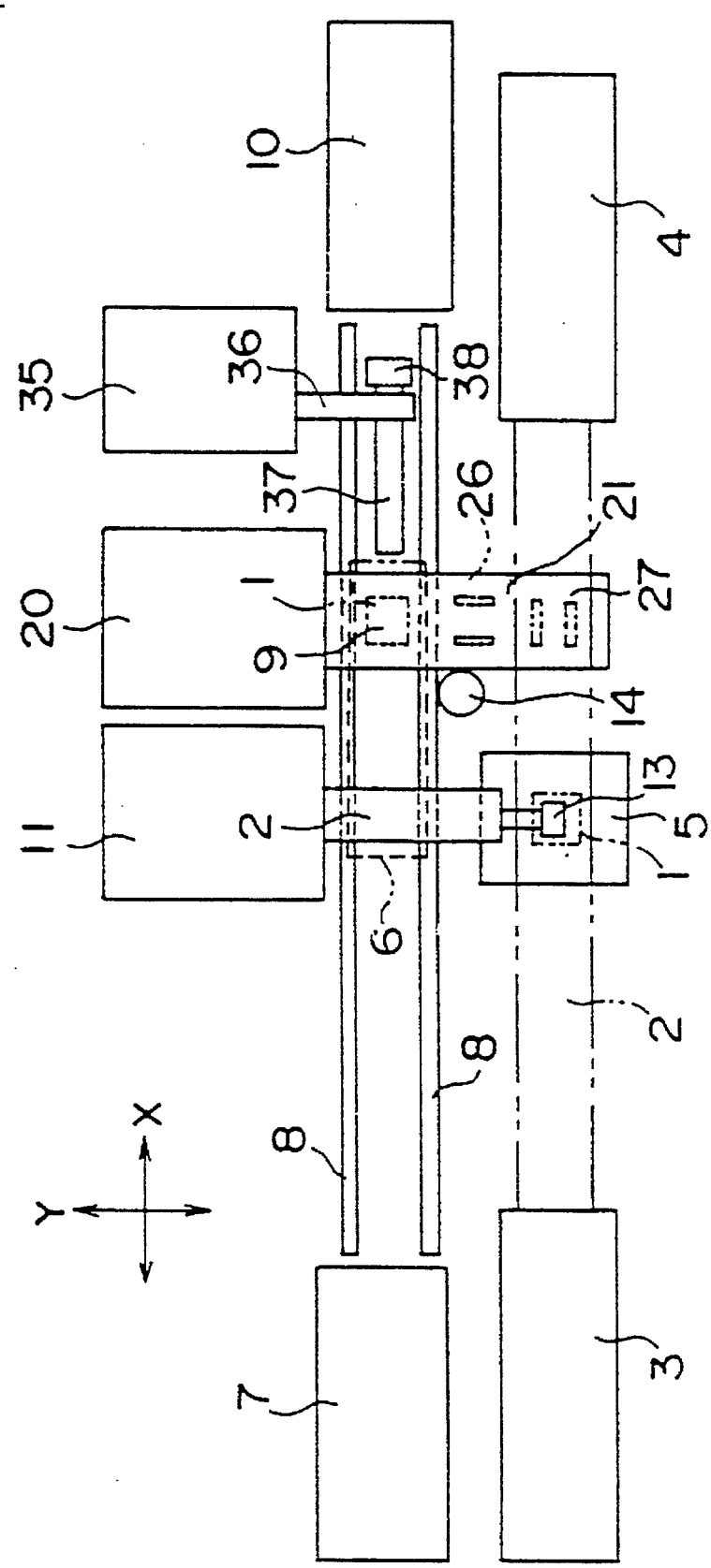
FIG. 1 is a schematic top view of one embodiment of the external lead bonding apparatus of the present invention.
Figure 2:
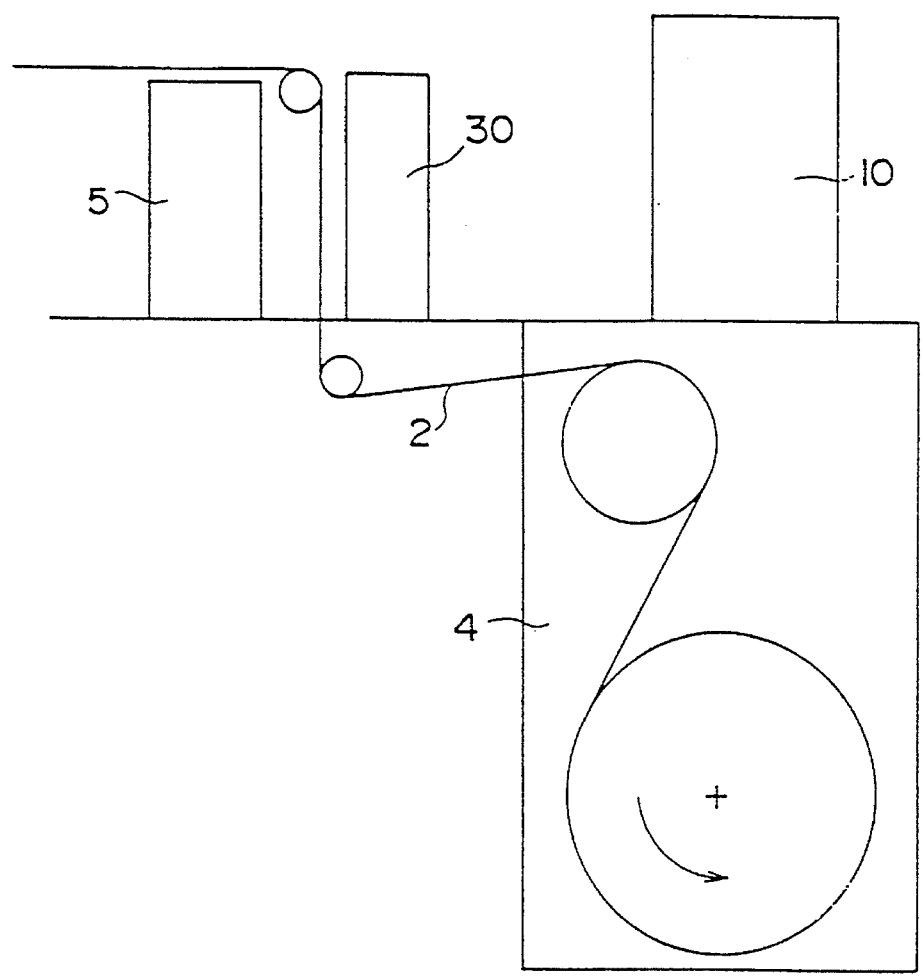
FIG. 2 shows the flow of the film carrier after the carrier passes through the punching apparatus.
Figure 3:
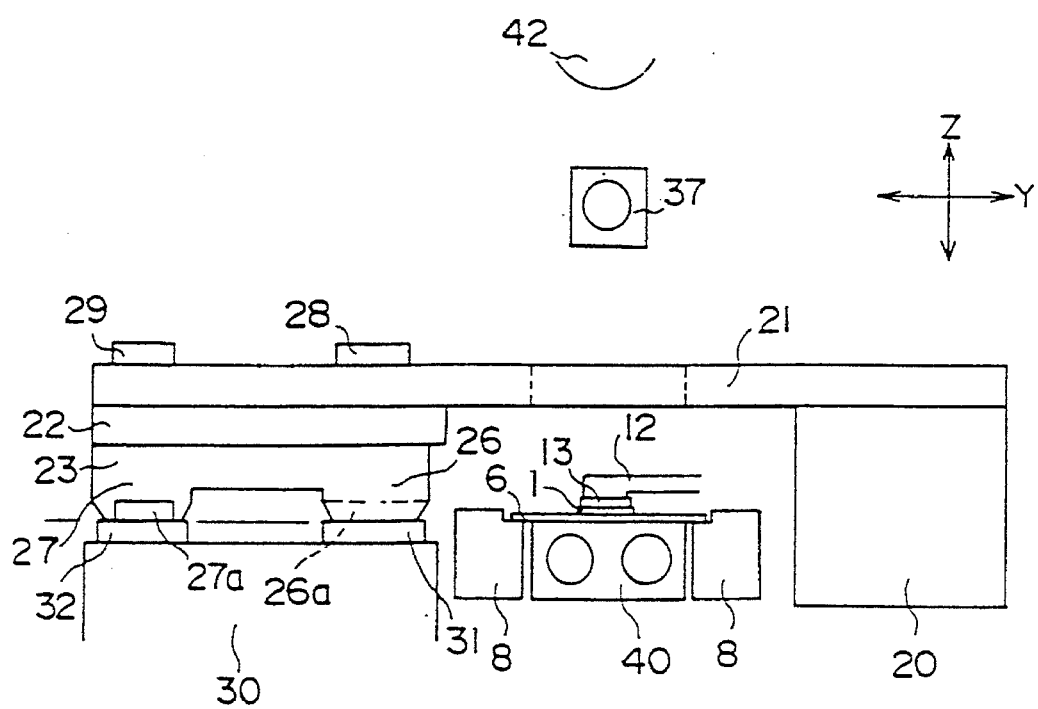
FIG. 3 is an enlarged side view of the essential portion of the apparatus shown in FIG. 1.

As shown in FIGS. 1, 2 and 3, a film carrier 2 which carries thereon solid-state devices 1 at equal intervals is intermittently fed from a film loader 3 to a film unloader 4. A punching apparatus 5 which punches out the solid-state devices 1 is installed in the conveying path of the film carrier 2. Lead frames 6 are fed along guide rails 8 from a frame loader 7 and accommodated in a frame unloader 10 after the solid-state devices 1 have been bonded to the lead frames 6 at a bonding station 9.

The solid-state devices punched out by the punching apparatus 5 are suction-chucked by a vacuum suction chucking head 13 which is installed on the transporting arm 12 of a transporting apparatus 11 that is driven in the X, Y, Z and theta directions, and the external leads of each solid-state device 1 are pressed against the leads of the corresponding lead frame 6 positioned in the bonding station 9.

An external lead detection camera 14 which detects positional discrepancies in the external leads of the solid-state device 1 that is suction-chucked by the vacuum suction chucking head 13 is installed between the punching apparatus 5 and the bonding station 9.

The above-described structure is conventional and well known. Thus, a further and detailed description will be omitted.

As shown in FIGS. 1 and 3, a bonding apparatus 20 which is driven in the X and Y (horizontal) directions and Z (vertical) direction is installed so as to face the bonding station 9 on one side of the guide rails 8. A tool arm 21 is attached to this bonding apparatus 20. A bonding tool 23 is fastened to the undersurface of the tip end of the tool arm 21 via a tool inclination adjustment mechanism 22.

Figure 5:
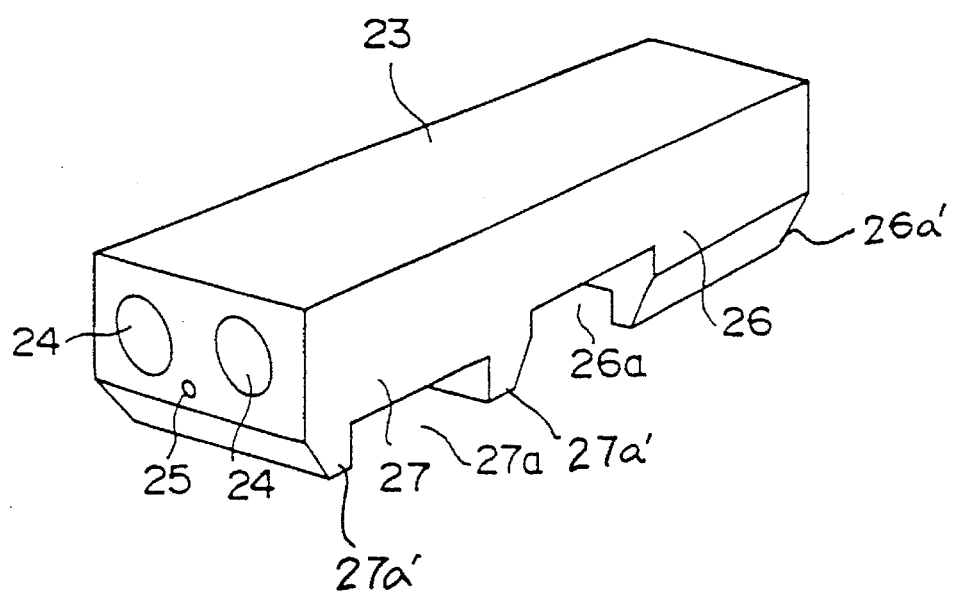
FIG. 5 is an enlarged perspective view of the bonding tool used in the apparatus shown in FIG. 1.

As shown in FIG. 5, a heater 24 and a thermocouple 25 are embedded in the bonding tool 23, and the lower part of the bonding tool 23 has first and second bonding tool sections 26 and 27. At positions corresponding to these first and second bonding tool sections 26 and 27, pressure-receiving plates 28 and 29 are fastened to the upper surface of the tool arm 21.

The first bonding tool section 26 has an escape space 26a which is formed in the Y direction so that it can straddle the main body of the solid-state device 1 and so that the vacuum suction chucking head 13 can be inside the escape space 26a. The bonding tool section 26 is to bond the external leads on two opposite Kides of the solid-state device 1. The second bonding tool section 27 has an escape space 27a which is formed at a right angle to the escape space 26a.

More specifically, the escape spaces 26a and 27a are the areas defined by two facing ridges 26a' and 27a' and are large enough so that the solid-state device 1 and the vacuum suction chucking head 13 do not contact the inner surfaces of the escape spaces 26a and 27a.

As seen in FIG. 3, a tool cleaning stand 30 which is driven in the X and Y directions is installed on the opposite side of guide rails 8 from the bonding apparatus 20, and grindstones 31 and 32 which clean the first and second bonding tool sections 26 and 27 are installed on the tool cleaning stand 30.

Figure 4:
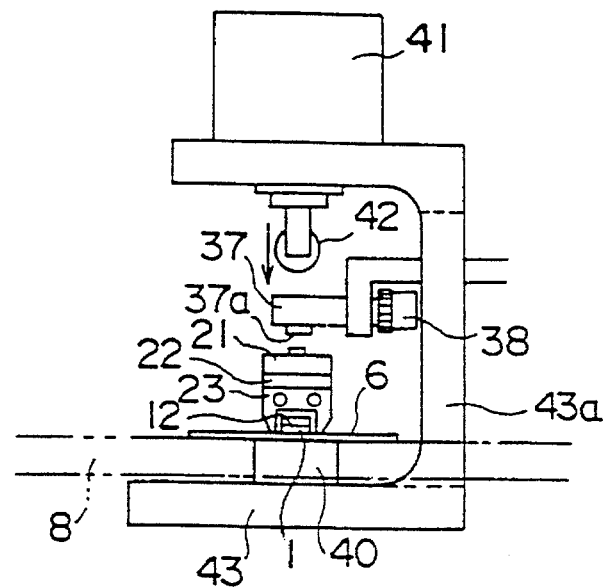
FIG. 4 is an end view of the essential portion of the apparatus shown in FIG. 1.

As shown in FIGS. 1, 3 and 4, an XY table 35 which is driven in the X and Y directions is installed on one side of the bonding apparatus 20, and a detection arm 36 which extends in the Y direction is attached to the XY table 35. An optical tube 37 which has a detection surface 37a on the undersurface of the tip end is fastened to the detection arm 36, and a lead frame detection camera 38 is mounted to the optical tube 37. A heater block 40 is installed in the area of the bonding station 9 between the guide rails 8.

Furthermore, a pressure application cylinder 41 is installed above the heater block 40 in the area of the bonding station 9, and a pressing roller 42 is supported on the operating rod of the pressure application cylinder 41 in a manner that the pressing roller 42 is free to rotate. The heater block 40 and pressure application cylinder 41 are fastened to a C-shaped supporting stand 43 which has an escape hole 43a through which the guide rails 8 and the optical tube 37 can pass so that the supporting stand 43 do not interfere the guide rails 8 and the optical tube 37.

In operation, the film carrier 2 is intermittently fed from the film loader 3 to the film unloader 4. When the solid-state device 1 is positioned at the punching apparatus 5, the solid-state device 1 is punched out by the punching apparatus 5 and is suction-chucked by the vacuum suction chucking head 13 of the transporting apparatus 11.

The vacuum suction chucking head 13 with the solid-state device 1 attached is raised and driven in the X and Y directions so that it is positioned beneath the external lead detection camera 14. Any positional discrepancies (shifts in the X, Y or theta directions) of the external leads of the solid-state device 1 are detected. Based on the results of this positional discrepancy detection, the transporting apparatus 11 performs a positional correction so as to correctly position the solid-state device 1 directly above the predetermined position of the corresponding lead frame 6.

The above-described operation is the same as that of a conventional system.

The lead frames 6 are fed along the guide rails 8 from the frame loader 7 by a frame feeder (not shown), and the leads that are to be bonded are positioned in the bonding station 9. In the conventional apparatus, the vacuum suction chucking head 13 with the solid-state device 1 attached is lowered, and the solid-state device 1 is held so that it is pressed against the lead frame 6.

In the present invention, however, since the lead frame detection camera 38 is provided, when the lead frame 6 is positioned, any positional discrepancy in the leads of the lead frame 6 is detected by the lead frame detection camera 38 which is moved horizontally by the XY table 35 through the detection arm 36. Thus, in the present invention, the transporting apparatus 11 is driven so that not only the positional discrepancies in the leads of the lead frame 6 but the positional discrepancies in the external leads of the solid-state device 1 attached to the vacuum suction chucking head 13 is also corrected. After the lead frame detection camera 38 has detected the leads of the lead frame 6, the camera 38 is withdrawn from the bonding station 9 by the XY table 35.

When the solid-state device 1 attached to the vacuum suction chucking head 13 is correctly positioned directly above the prescribed position of the corresponding lead frame 6, the transporting arm 12 is lowered so that the solid-state device 1 is placed on the lead frame 6, and the solid-state device 1 is held "as is" so that it is pressed lightly against the lead frame 6.

Next, the tool arm 21 is raised and driven in the X and Y directions so that the first bonding tool section 26 of the bonding tool 23, which up to this point has been positioned on the grindstones 31 and 32, is positioned above the solid-state device 1.

Next, the tool arm 21 is lowered so that the ridges 26a' of the first bonding tool section 26 simultaneously presses the external leads installed on two opposite sides of the solid-state device 1 against the lead frame 6 while allowing both the main body of the solid-state device 1 and the vacuum suction chucking head 13 not to come into contact with the inner surfaces of the escape space 26a so that interference with the escape space 26a is avoided. The pressure application cylinder 41 is then actuated so that the pressing roller 42 presses against the pressure-receiving plate 28, thus causing bonding to be performed. After this bonding is completed, the pressure application cylinder 41 is operated so that the pressing roller 42 is raised.

Afterward, the tool arm 21 is raised. The suction-chucking of the solid-state device 1 by the vacuum suction chucking head 13 is stopped, and the vacuum suction chucking head is raised and moved to a position above the punching apparatus 5.

Next, the tool arm 21 is driven in the X and Y directions so that the second bonding tool section 27 is positioned above the solid-state device 1. The tool arm 21 is then lowered, so that the external leads on the remaining two opposite sides of the solid-state device 1 are pressed against the leads of the lead frame 6 by the ridges 27a' of the second bonding tool section 7. In this case also, the main body of the solid-state device 1 and the vacuum suction chucking head 13 do not come into contact with the inner surfaces of the escape space 27a. Afterward, the pressure application cylinder 41 is actuated so that the external leads on the remaining two opposite sides of the solid-state device 1 are simultaneously bonded to the leads of the lead frame 6 in the same manner as described above.

Following this bonding step, the pressing roller 42 of the pressure application cylinder 41 is raised, and the tool arm 21 is raised and moved in the X and Y directions and then lowered so that the first and second bonding tool sections 26 and 27 are positioned on the grindstones 31 and 32.

In this way, a series of bonding operations is completed. Subsequently, this series of bonding operations is repeated. When the bonding tool 23 is positioned on the grindstones 31 and 32, the tool cleaning stand 30 is driven as necessary in the X and Y directions so that the first and second bonding tool sections 26 and 27 are cleaned by the grindstones 31 and 32.

As seen from the above, since the bonding tool 23 which has the first and second bonding tool sections 26 and 27 is attached to the tool arm 21, all four sides of each solid-state device 1 can be bonded by a single bonding apparatus 20. Accordingly, equipment costs can be reduced.

Furthermore, since bonding is performed at a single bonding station 9 using a single bonding apparatus 20, the required installation space can also be reduced.

Moreover, since the bonding tool 23 that has the first and second bonding tool sections 26 and 27 is used, the time required for adjustment and maintenance can also be reduced.

Though a single bonding tool 23 was used in the embodiment described above, it would be possible to form the first and second bonding tool sections 26 and 27 separately.

As seen from the above, according to the present invention, the first and second bonding tool sections are provided on a single tool arm. Thus, all four sides of each solid-state device are bonded with a single bonding apparatus. As a result, equipment costs can be reduced, and the time required for adjustment and maintenance can be reduced. In addition, since bonding is performed at a single bonding station using a single bonding apparatus, the required installation space can be reduced.

I claim:

1. An external lead bonding method using a tool arm which comprises a first bonding tool section which bonds external leads installed along two opposite sides of a solid-state device to the leads of a lead frame and a second bonding tool section which bonds external leads installed along the other two opposite sides of said solid-state device to said leads of said lead frame, wherein said method comprising the steps of:

bonding said outer leads of said solid-state device to said leads of said lead frame by said first bonding tool section with said solid-state device attached via vacuum suction to a vacuum suction chucking head and pressed against the lead frame;

stopping said vacuum suction chucking of said solid-state device via said vacuum suction chucking head;

withdrawing vacuum suction chucking head from said bonding station; and bonding remaining two opposite sides of said solid-state device by said second bonding tool section.

2. An external lead bonding apparatus comprising:

a vacuum suction chucking head for pressing a suction-chucked solid-state device against a lead frame which is positioned in a bonding station; and a bonding apparatus which bonds external leads of a solid-state device to leads of a lead frame, said tool arm being provided with:

a first bonding tool section which has an escape space formed therein so that said escape space being kept from interfering with a vacuum suction chucking head, said first bonding tool simultaneously bonding said external leads installed along two opposite sides of said solid-state device, while said device is pressed against said lead frame by vacuum suction chucking head, to leads of said lead frame, and a second bonding tool section which simultaneously bonds external leads installed along other two opposite sides of said solid-state device to leads of said lead frame.

3. An external lead bonding apparatus according to claim 2, wherein said bonding apparatus which has said tool arm is driven in X, Y and Z directions.

4. A bonding apparatus for bonding external leads of a square solid-state device to leads of a lead frame comprising a bonding tool which is provided with two bonding sections so that leads of two opposing sides of said square solid-state device are bonded by one of said two bonding sections and leads of other two opposing sides of said square solid-state device are bonded by another one of said two bonding sections.

5. A bonding apparatus according to claim 4, wherein each one of said two separate bonding sections is defined by a pair of ridges facing each other, and ridges of one of said two bonding sections extends perpendicular to ridges of another one of said two separate bonding sections.

6. A bonding apparatus according to claim 5, wherein each one of said two bonding sections is substantially square and substantially larger than said square solid-state device.

* * * * *